United States Patent
Long et al.

(10) Patent No.: US 6,848,045 B2
(45) Date of Patent: Jan. 25, 2005

(54) INTEGRATED USB CONNECTOR FOR PERSONAL TOKEN

(75) Inventors: Calvin Wen-Kaug Long, Arcadia, CA (US); Allan D. Anderson, Cerritos, CA (US); Alfred L. Johnson, Cypress, CA (US)

(73) Assignees: Rainbow Technologies, Inc., Irvine, CA (US); Rainbow Technologies, B.V., Rotterdam (NL)

(*) Notice: Subject to any disclaimer, the term of this patent is extended or adjusted under 35 U.S.C. 154(b) by 115 days.

(21) Appl. No.: 10/177,012

(22) Filed: Jun. 21, 2002

(65) Prior Publication Data

US 2003/0028797 A1 Feb. 6, 2003

Related U.S. Application Data

(63) Continuation-in-part of application No. 09/594,456, filed on Jan. 15, 2000, which is a continuation-in-part of application No. 09/449,159, filed on Nov. 24, 1999, which is a continuation-in-part of application No. 09/281,017, filed on Mar. 30, 1999, application No. 10/177,012, which is a continuation-in-part of application No. 09/449,159, and a continuation-in-part of application No. 09/281,017.

(60) Provisional application No. 60/300,286, filed on Jun. 22, 2001, and provisional application No. 60/116,006, filed on Jan. 15, 1999.

(51) Int. Cl.[7] .............................................. G06F 9/445
(52) U.S. Cl. ......................................... 713/4; 1713/200
(58) Field of Search ................................ 713/200, 201, 713/202, 172, 182, 185, 194; 709/223, 224, 225, 226, 229; 705/55; 439/43, 44, 46, 53

(56) References Cited

U.S. PATENT DOCUMENTS

| | | | | |
|---|---|---|---|---|
| 408,384 A | * | 8/1889 | Hata et al. ................. 66/190 |
| 4,577,289 A | * | 3/1986 | Comerford et al. .......... 360/60 |
| 4,799,258 A | | 1/1989 | Davies |
| 5,212,729 A | * | 5/1993 | Schafer ...................... 705/55 |
| 5,637,015 A | * | 6/1997 | Tan et al. .................. 439/607 |
| 5,658,170 A | * | 8/1997 | Tan et al. .................. 439/610 |
| 5,706,426 A | * | 1/1998 | Hsu .......................... 713/200 |
| 5,812,662 A | * | 9/1998 | Hsu et al. .................... 705/55 |
| 5,857,024 A | | 1/1999 | Nishino et al. |
| D408,384 S | * | 4/1999 | Hata et al. ................ D14/433 |
| 5,892,216 A | * | 4/1999 | Grant et al. ................ 235/492 |
| 5,975,954 A | * | 11/1999 | Wu et al. .................. 439/607 |
| 6,033,257 A | * | 3/2000 | Lake et al. ................ 439/502 |
| 6,038,320 A | * | 3/2000 | Miller ........................ 380/44 |
| 6,128,741 A | * | 10/2000 | Goetz et al. ............... 713/200 |

FOREIGN PATENT DOCUMENTS

| | | |
|---|---|---|
| EP | 0 936 530 A1 | 8/1989 |
| EP | 0 791 877 A1 | 8/1997 |
| EP | 1 001 329 A2 | 5/2000 |
| GB | 2 154 344 A | 9/1985 |
| WO | WO 00/23936 | 4/2000 |
| WO | WO 00/75755 A1 | 12/2000 |

OTHER PUBLICATIONS

Keylok, www.keylok.com.*

(List continued on next page.)

*Primary Examiner*—Ayaz Sheikh
*Assistant Examiner*—Jenise Jackson

(57) ABSTRACT

A personal key having an inexpensive and robust integrated USB connector is disclosed. The apparatus comprises a circuit board having a processor and a plurality of conductive traces communicatively coupling the processor to a peripheral portion of the circuit board. The plurality of conductive traces includes, for example, a power trace, a ground trace, and at least two signal traces. The apparatus also comprises a first housing, having an aperture configured to accept the periphery of the circuit board therethrough, thereby presenting the plurality of conductive traces exterior to the aperture. The apparatus also comprises a shell, surrounding the plurality of conductive traces, the shell including at least one locking member interfacing with the first housing.

30 Claims, 13 Drawing Sheets

OTHER PUBLICATIONS

Matirxlock, 2003.*
Microcosm, 2004.*
Aladdin, 2003.*
ST secuirty token, Rockey.*
Neale, May 1999, Electronic Engineering, v. 71, n. 868.*
Unix Today, 1991, n. 76.*
Duksta, Network World, Aug. 24, 1998.*
Cebit, Mar. 15, 1995, Newsbytes.*
Mahabharat, Nov. 17, 1992, Neweswbytes.*

WIBU–Systems AG, "WIBU–KEY User's Guide Version 2.50", Jul. 1998, XP002139265, Internet: <URL:ftp://www2.wibu.de/pub/download/us/UG250US.pdf>, pp. 12–14, 163–164.

Rainbow Technologies, News Release, "Rainbow Technologies Adds USB Support For PC And Macintosh Software Developers To Sentinel Line," Nov. 17, 1998, XP002139273, Internet: http://www.rainbow.com/invest/PR981117b.html (2 pages).

* cited by examiner

INTEGRATED USB CONNECTOR FOR PERSONAL TOKEN

CROSS-REFERENCE TO RELATED APPLICATIONS

This application claims benefit of U.S. Provisional Patent Application No. 60/300,286, entitled "INTEGRATED USB CONNECTOR FOR PERSONAL TOKEN," by Calvin Wen-Kaug Long, Allan D. Anderson, and Alfred L. Johnson, filed Jun. 22, 2001, which is hereby incorporated by reference herein.

This application is also a continuation-in-part of the following U.S. patent applications, all of which applications are hereby incorporated by reference herein:

U.S. patent application Ser. No. 09/281,017, filed Mar. 30, 1999 by Shawn D. Abbott, Bahram Afghani, Allan D. Anderson, Patrick N. Godding, Maarten G. Punt, and Mehdi Sotoodeh, and entitled "USB-Compliant Personal Key," which claims benefit of U.S. Provisional Patent Application No. 60/116,006, filed Jan. 15, 1999 by Shawn D. Abbott, Barham Afghani, Allan D. Anderson, Patrick N. Godding, Maarten G. Punt, and Mehdi Sotoodeh, and entitled "USB-Compliant Personal Key";

U.S. patent application Ser. No. 09/449,159, filed Nov. 24, 1999, by Shawn D. Abbott, Bahram Afghani, Mehdi Sotoodeh, Norman L. Denton III, and Calvin W. Long, and entitled "USB-Compliant Personal Key with Integral Input and Output Devices", which is a continuation-in-part of U.S. patent application Ser. No. 09/281,017, filed Mar. 30, 1999 by Shawn D. Abbott, Bahram Afghani, Allan D. Anderson, Patrick N. Godding, Maarten G. Punt, and Mehdi Sotoodeh, and entitled "USB-Compliant Personal Key," which claims benefit of U.S. Provisional Patent Application No. 60/116,006, filed Jan. 15, 1999 by Shawn D. Abbott, Barham Afghani, Allan D. Anderson, Patrick N. Godding, Maarten G. Punt, and Mehdi Sotoodeh, and entitled "USB-Compliant Personal Key,"

U.S. patent application Ser. No. 09/594,456, filed Jan. 15, 2000, by Shawn D. Abbot, Allan D. Anderson, Patrick N. Godding, Maarten G. Punt, and Mehdi Sotooodeh, and entitled "USB-Compliant Personal Key Using a Smartcard Processor and a Smartcard Reader Emulator", which is a continuation-in-part of U.S. patent application Ser. No. 09/449,159, filed Nov. 24, 1999, by Shawn D. Abbott, Bahram Afghani, Mehdi Sotoodeh, Norman L. Denton III, and Calvin W. Long, and entitled "USB-Compliant Personal Key with Integral Input and Output Devices," which is a continuation-in-part of U.S. patent application Ser. No. 09/281,017, filed Mar. 30, 1999 by Shawn D. Abbott, Bahram Afghani, Allan D. Anderson, Patrick N. Godding, Maarten G. Punt, and Mehdi Sotoodeh, and entitled "USB-Compliant Personal Key," which claims benefit of U.S. Provisional Patent Application No. 60/116,006, filed Jan. 15, 1999 by Shawn D. Abbott, Barham Afghani, Allan D. Anderson, Patrick N. Godding, Maarten G. Punt, and Mehdi Sotoodeh, and entitled "USB-Compliant Personal Key."

BACKGROUND OF THE INVENTION

1. Field of the Invention

The present invention relates to computer peripherals, and in particular to a personal key providing integrated password and digital certificate management, software security, and personal identification capability in a single compact package.

2. Description of the Related Art

In the last decade, the use of personal computers in both the home and in the office have become widespread. These computers provide a high level of functionality to many people at a moderate price, substantially surpassing the performance of the large mainframe computers of only a few decades ago. The trend is further evidenced by the increasing popularity of laptop and notebook computers, which provide high-performance computing power on a mobile basis.

The widespread availability of personal computers has had a profound impact on interpersonal communications as well. Only a decade ago, telephones or fax machines offered virtually the only media for rapid business communications. Today, a growing number of businesses and individuals communicate via electronic mail (e-mail). Personal computers have also been instrumental in the emergence of the Internet and its growing use as a medium of commerce.

While certainly beneficial, the growing use of computers in personal communications, commerce, and business has also given rise to a number of unique challenges.

First, the growing use of computers has resulted in extensive unauthorized use and copying of computer software, costing software developers substantial revenue. Although unauthorized copying or use of software is a violation of the law, the widespread availability of pirated software and enforcement difficulties have limited the effectiveness of this means of preventing software piracy.

Software developers and computer designers alike have sought technical solutions to attack the problem of software piracy. One solution uses an external device known as a hardware key, or "dongle" coupled to an input/output (I/O) port of the host computer.

While the use of such hardware keys is an effective way to reduce software piracy, to date, their use has been substantially limited to high value software products. Hardware keys have not been widely applied to popular software packages, in part, because the hardware keys are too expensive, and in part, because there is a reluctance on the part of the application program user to bother with a hardware key whenever use of the protected program is desired.

While it reflects a tremendous advance over telephones and facsimile machines, e-mail also has its problems. One of these problems involves security. Telephone lines are relatively secure and a legally sanctioned way to engage in the private transmission of information, however, e-mails are generally sent over the Internet with no security whatsoever. Persons transmitting electronic messages must be assured that their messages are not opened or disclosed to unauthorized persons. Further, the addressee of the electronic message should be certain of the identity of the sender and that the message was not tampered with at some point during transmission.

Although the packet-switching nature of Internet communications helps to minimize the risk of intercepted communications, it would not be difficult for a determined interloper to obtain access to an unprotected e-mail message. Many methods have been developed to secure the integrity of electronic messages during transmission. Simple encryption is the most common method of securing data. Both secret key encryption such as DES (Data Encryption Standard) and public key encryption methods that use both a public and a private key are implemented. Public and private key encryption methods allow users to send Internet and e-mail messages without concern that the message will be read by unauthorized persons or that its contents will be tampered with. However, key cryptographic methods do not protect the receiver of the message, because they do not allow the recipient to authenticate the validity of the public key or to validate the identity of the sender of the electronic message.

The use of digital certificates presents one solution to this problem. A digital certificate is a signed document attesting to the identity and public key of the person signing the message. Digital certificates allow the recipient to validate the authenticity of a public key. However, the typical user may use e-mail to communicate with hundreds of persons, and may use any one of several computers to do so. Hence, a means for managing a number of digital certificates across several computer platforms is needed.

Internet commerce raises other challenges. Users seeking to purchase goods or services using the Internet must be assured that their credit card numbers and the like are safe from compromise. At the same time, vendors must be assured that services and goods are delivered only to those who have paid for them. In many cases, these goals are accomplished with the use of passwords. However, as Internet commerce becomes more commonplace, customers are finding themselves in a position where they must either decide to use a small number of passwords for all transactions, or face the daunting task of remembering multiple passwords. Using a small number of passwords for all transactions inherently compromises security, since the disclosure of any of the passwords may lead to a disclosure of the others. Even the use of a large number of passwords can lead to compromised security. Because customers commonly forget their password, many Internet vendors provide an option whereby the user can be reminded of their password by providing other personal information such as their birthplace, mother's maiden name, and/or social security number. This feature, while often necessary to promote Internet commerce, severely compromises the password by relying on "secret" information that is in fact, publicly available.

Even in cases where the user is willing and able to keep track of a large number of passwords, the password security technique is often compromised by the fact that the user is inclined to select a password that is relatively easy to remember. It is indeed rare that a user selects a truly random password. What is needed is a means for generating and managing random passwords that can be stored and recalled for use on a wide variety of computer platforms.

Internet communications have also seen the increased use of "cookies." Cookies comprise data that keep track of a user's patterns and preferences that can be downloaded from the Internet server for storage on the user's computer. Typically, cookies contain a range of addresses. When the browser encounters those addresses again, the cookies associated with the addresses are provided to the Internet server. For example, if a user's password were stored as a cookie, the use of the cookie would allow the user to request services or goods without requiring that the user enter the password again when accessing that service for the second and subsequent time.

Many users object to storage of cookies on their computer's hard drive. In response to these concerns, Internet browser software allows the user to select an option so that they are notified before cookies are stored or used. The trouble with this solution is that this usually results in an excessive number of messages prompting the user to accept cookies. A better solution than this all-or-nothing approach would be to allow the storage and/or use of cookies, but to isolate and control that storage and use to comply with user-specified criteria.

Personal keys, such as the IKEY product available from RAINBOW TECHNOLOGIES, INC. present a solution to the foregoing need. They offer a portable and secure repository for private keys, passwords, digital certificates, and cookies.

One roadblock to the universal acceptance of personal keys is cost. Although the personal keys are not typically expensive, many potential customers are dissuaded from purchasing a personal key by even modest cost.

Although not typically expensive in the usual sense, one of the major contributors to the cost of the personal key is the interface between the host computer and the key itself . . . the USB interface. The USB interface is also one of the few physical components in the physical key that is subject to wear from repeated insertions. What is needed is simple, inexpensive, and robust USB interface.

Another cost factor concerns the configurability of the process used to manufacture the keys. While it is desirable to manufacture keys in a variety of shapes and sizes, such flexibility is usually inconsistent with inexpensive manufacturing techniques, and just-in-time product delivery. What is needed is a design which can be manufactured by a highly configurable and customizable process, and allows final assembly of the customizable elements just prior to shipping.

Security concerns are another roadblock to universal acceptance. Since the keys are used as a central repository for a large volume of highly confidential information, it is important to protect the such information from unauthorized disclosure. Further, it is important to provide for a means to determine if an unauthorized disclosure may have occurred.

The present invention satisfies that needs, by providing a low cost, tamper evident key that can be economically produced in a wide variety of user configurations.

SUMMARY OF THE INVENTION

To address the requirements described above, the present invention discloses a personal key having an inexpensive and robust integrated USB connector. The apparatus comprises a circuit board having a processor and a plurality of conductive traces communicatively coupling the processor to a peripheral portion of the circuit board. The plurality of conductive traces includes, for example, a power trace, a ground trace, and at least two signal traces. The apparatus also comprises a first housing, having an aperture configured to accept the periphery of the circuit board therethrough, thereby presenting the plurality of conductive traces exterior to the aperture. The apparatus also comprises a plug, insertable into the first housing, the plug comprising at least one member communicable with a cooperating member of the circuit board to retain the circuit board in the first housing aperture and a shell, surrounding the plurality of conductive traces, the shell including at least one locking member interfacing with the first housing.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
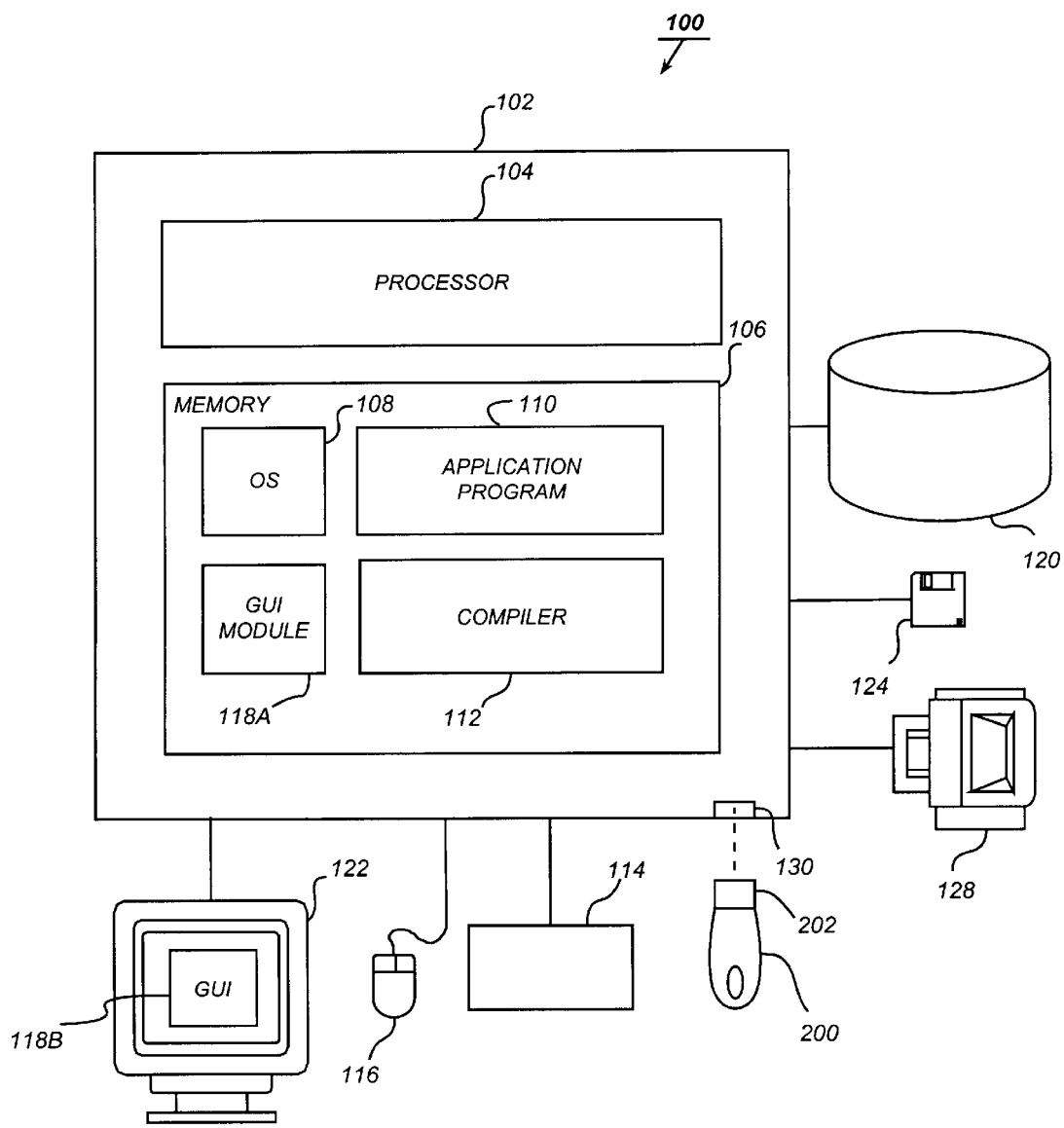
FIG. 1 is a block diagram showing an exemplary computer system.

FIG. 1 illustrates an exemplary computer system 100 that could be used to implement the present invention. The computer 102 comprises a processor 104 and a memory, such as random access memory (RAM) 106. The computer 102 is operatively coupled to a display 122, which presents images such as windows to the user on a graphical user interface 118B. The computer 102 may be coupled to other devices, such as a keyboard 114, a mouse device 116, a printer 128, etc. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the computer program 110, or implemented with special purpose memory and processors. The computer 102 also implements a compiler 112 which allows an application program 110 written in a programming language such as COBOL, C++, FORTRAN, or other language to be translated into processor 104 readable code. After completion, the application 110 accesses and manipulates data stored in the memory 106 of the computer 102 using the relationships and logic that are generated using the compiler 112. The computer 102 also comprises an input/output (I/O) port 130 for a personal key 200. The personal key 200 includes an I/O interface 202. In the preferred embodiment, the I/O port 130 and the I/O interface are compliant with the requirements for the universal serial bus, as expressed, for example, in the "Universal Serial Bus Specification, Rev. 2.0," published Apr. 27, 2000 (hereinafter, such interfaces are referred to as USB-compliant).

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of instructions which, when read and executed by the computer 102, causes the computer 102 to perform the steps necessary to implement and/or use the present invention. Computer program 110 and/or operating instructions may also be tangibly embodied in memory 106 and/or data communications devices, thereby making a computer program product or article of manufacture according to the invention. As such, the terms "article of manufacture" and "computer program product" as used herein are intended to encompass a computer program accessible from any computer readable device or media.

Those skilled in the art will recognize that many modifications may be made to this configuration without departing from the scope of the present invention. For example, those skilled in the art will recognize that any combination of the above components, or any number of different components, peripherals, and other devices, may be used with the present invention.

Figure 2:
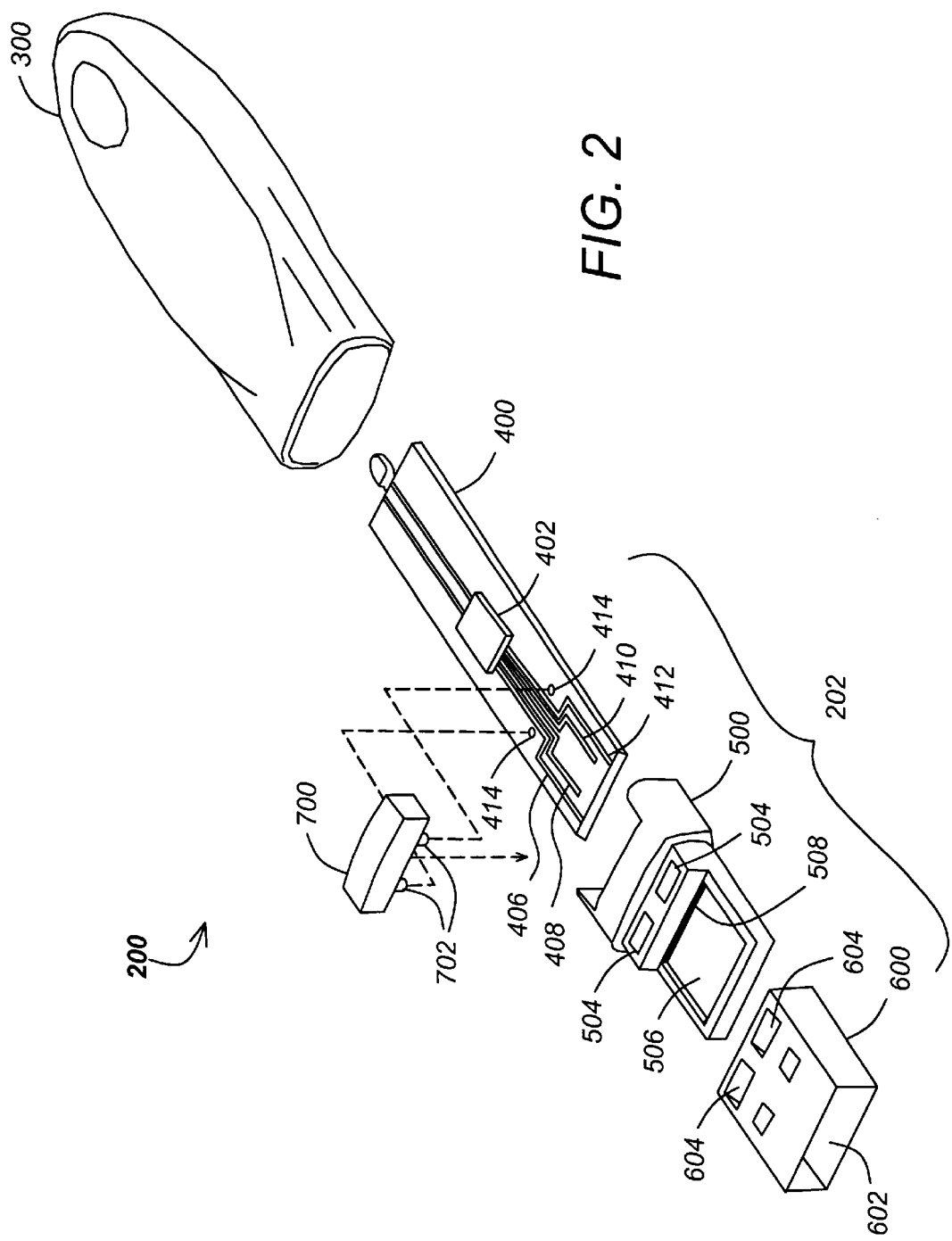
FIG. 2 is a diagram showing one embodiment of the present invention.

FIG. 2 is a diagram showing one embodiment of the present invention. The personal key 200 includes an exterior housing 300, a circuit board 400, a first housing 500, and a shell 600. In one embodiment, the shell 600 is formed from a stamped metal sheet and folded into shape, thereby forming a conductive shell. When assembled, a peripheral portion of the circuit board 400, the first housing 500, and the shell 600 form a USB-compliant I/O interface 202.

The circuit board 400 includes one or more components 402. The components 402 typically include memory and a processor. The circuit board 400 includes conductive traces 406–412 which extend from proximate the periphery of the circuit board 400 to the components 402, thus providing electrical continuity from near the periphery of the circuit board 400 to the components 402. In one embodiment, the circuit traces 406–412 include a first trace 406 for providing power to the personal key 200 components 402, a second trace 412 for providing a ground to the personal key 200 components 402, as well as a first signal trace 408 and a second signal trace 410. The signal traces 408, 410 provide data between the host computer 102 and the personal key 200 components 402.

The personal key 200 also comprises a first housing 500. The first housing 500 includes an aperture 508 sized and shaped to accept at least part of the peripheral portion of the circuit board 400 therethrough. The first housing 500 also comprises a depressed portion 506 where the peripheral portion of the circuit board 400 extends when inserted into the aperture 508, thus exposing the circuit board traces 406–412 so that connection can be made with these surfaces when the I/O interface 202 is inserted into the I/O port 130 of the host computer 102.

The circuit board 400 is secured to the first housing 500. In one embodiment, this is accomplished with a plug 700 that interfaces with the first housing and the circuit board. The plug 700 includes surface features 702 that mate with corresponding features in the circuit board 400 and the first housing 500 to secure the circuit board 400 within the first housing aperture 508. In the illustrated embodiment, the plug 700 includes one or more male structures (e.g. dowels) 702 that are sized and shaped to be insertable into female features or apertures 414 in the circuit board 400. When thus inserted, and when the external housing 300 is placed around the assembly, the circuit board 400 is retained within the first housing 500. The circuit board 400 can be secured to the first housing in other ways as well. For example, the first housing 500 may include male dowels that mate with female features on the plug 700. Further, although FIG. 2 illustrates an embodiment wherein the first housing includes a portion sized to accept the plug 700, this need not be the case.

The I/O interface 202 also includes a shell 600 which surrounds the external portion of the first housing 500 that presents the traces 406–412 on the circuit board 400 for connection to the host computer 102, thereby forming a cavity 602 therein. The shell 600 can be affixed to the first housing 500 via locking features or members 604 interfacing or communicating with cooperating features or members of the first housing 500, such as, for example, the depressed portions 504, thus locking the shell 600 into place.

Figure 3:
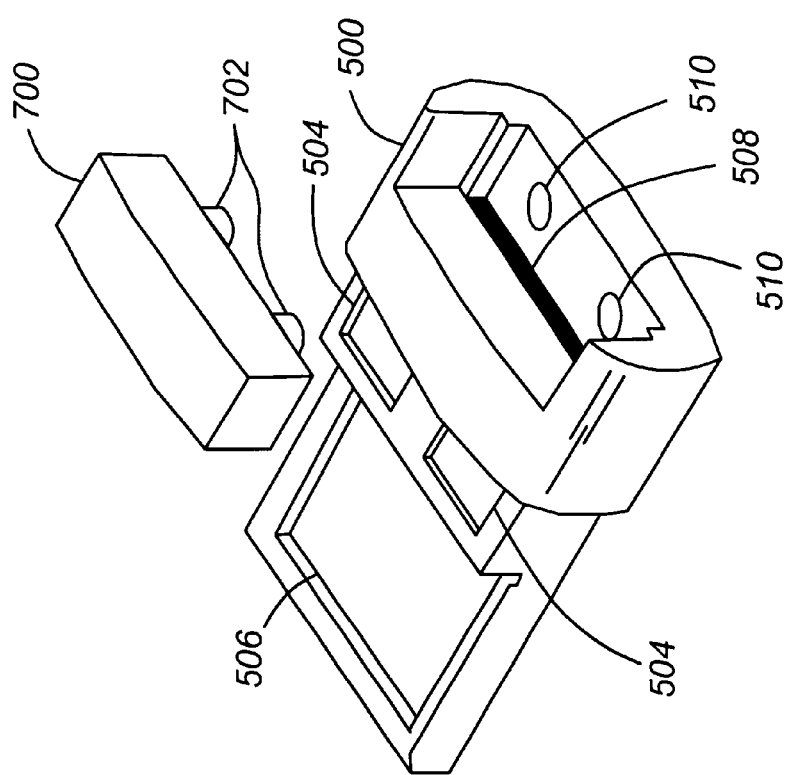
FIG. 3 is a diagram showing another view of the first housing and the plug of the present invention.

FIG. 3 is a diagram showing another view of the first housing 500 and the plug 700 of the present invention. As shown in this view, the housing 500 may comprise apertures 510 configured to receive and hold the male structures 702, thus affixing the circuit board 400 within the first housing 500 aperture 508 such that the periphery of the circuit board with the integrated circuit traces 406–412 are presented in the depressed portion 506.

Figure 4A:
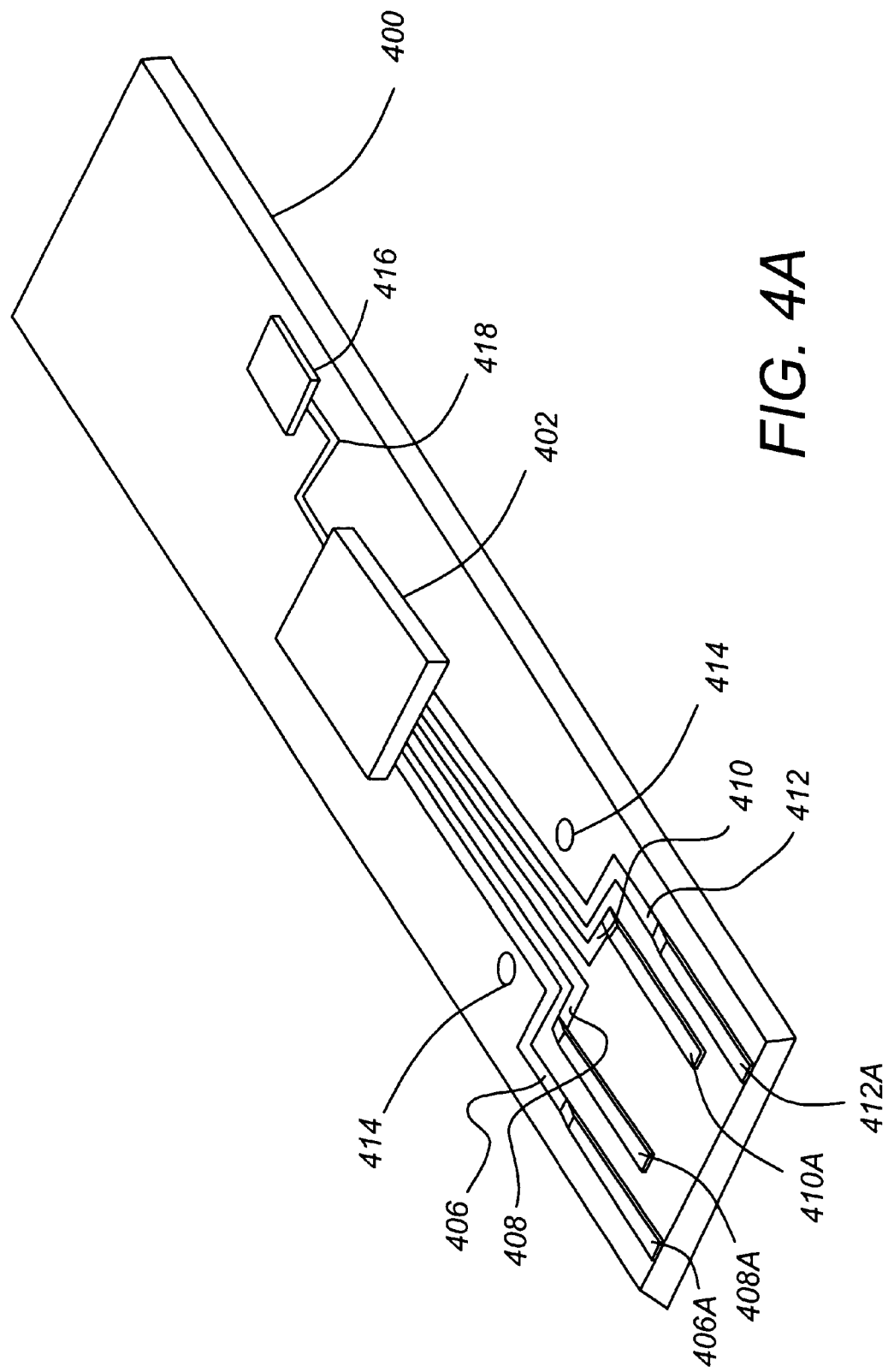
FIG. 4A is a diagram showing an embodiment in which the circuit traces include a bonded or electroplated conductive interface surface on the circuit board traces.

FIG. 4A is a diagram depicting another embodiment of the circuit board 402. In this embodiment, conductive interface surfaces 406A, 408A, 410A, and 412A are electrically coupled to the circuit board traces (406, 408, 410, and 412, respectively). The addition of the conductive interface surfaces 406A, 408A, 410A, and 412A allows this embodiment the wear caused by insertions/removals of the key 200 into the I/O port 130. The conductive interface surfaces 406A, 408A, 410A, and 412A can be electroplated or bonded onto the circuit traces 406, 408, 410, and 412. FIG. 4A also depicts a memory 416 communicatively coupled to the processor 402 by circuit trace(s) 418.

In one embodiment (FIG. 4A) the thickness of the conductive traces 406A, 408A, 410A, and 412A is increased beyond what is normally required for sufficient electrical communication between the component 402 and the I/O port 130. The additional thickness can be along the entire length of the conductive traces 406A, 408A, 410A, and 412A or only for those portions of the conductive traces 406A, 408A, 410A, and 412A that are subject to wear from inserting and removing the key 200 in and out of the I/O port 130.

Figure 4B:
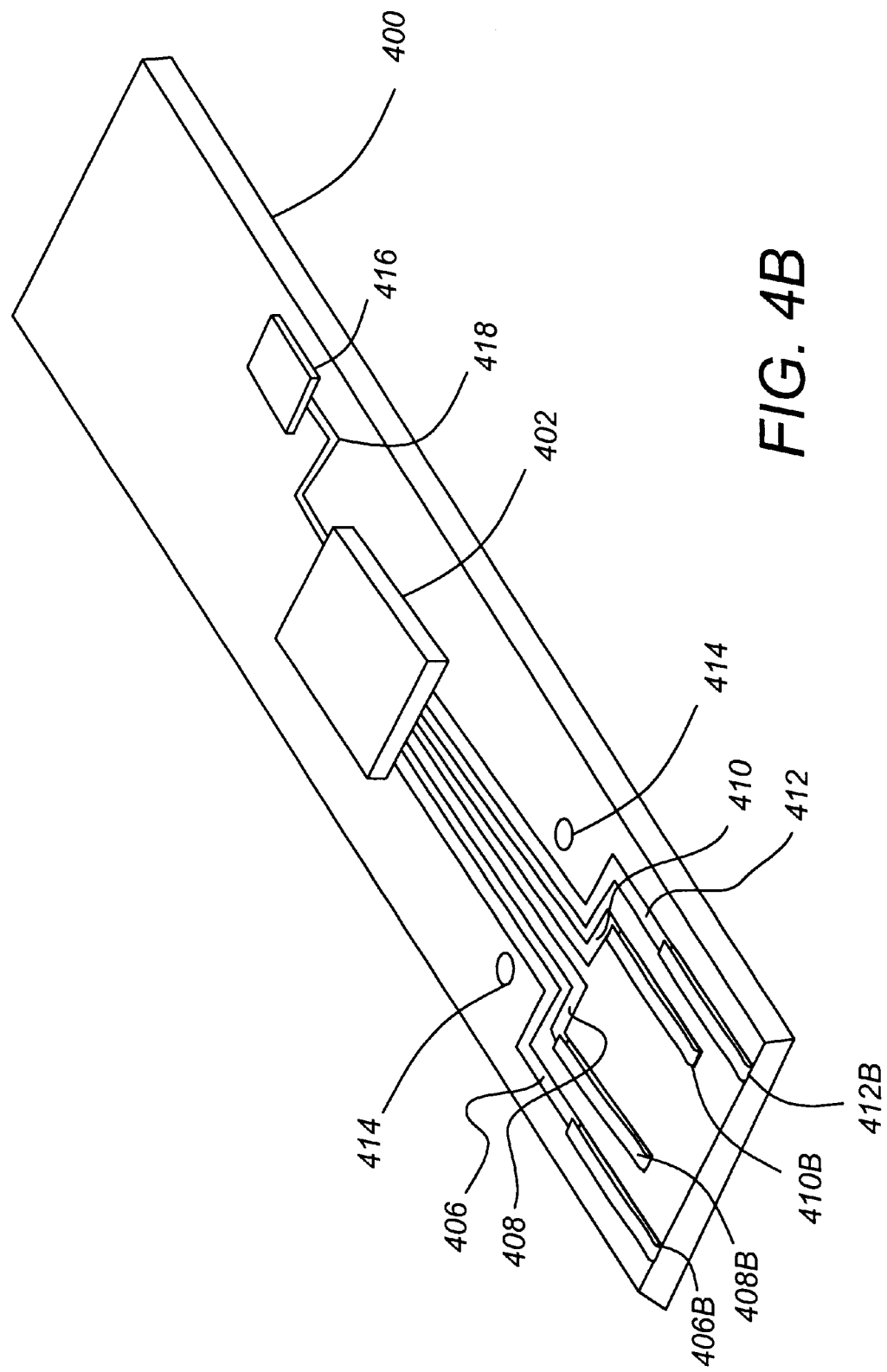
FIG. 4B is a diagram showing an embodiment in which the circuit traces include a spring.

FIG. 4B is a diagram depicting another embodiment of the circuit board 402. In this embodiment, the conductive interface surface comprises a spring 406B, 408B, 410B, and 412B electrically coupled to the circuit board traces (406, 408, 410, and 412, respectively). The springs 406B, 408B, 410B, and 412B provide extra thickness to account for the wear from inserting and removing the key 200 in and out of the I/O port 130. Further, the springs 406B, 408B, 410B, and 412B can also have specially designed surfaces or be made of a different material, to reduce wear and assure adequate electrical contact.

Figure 4C:
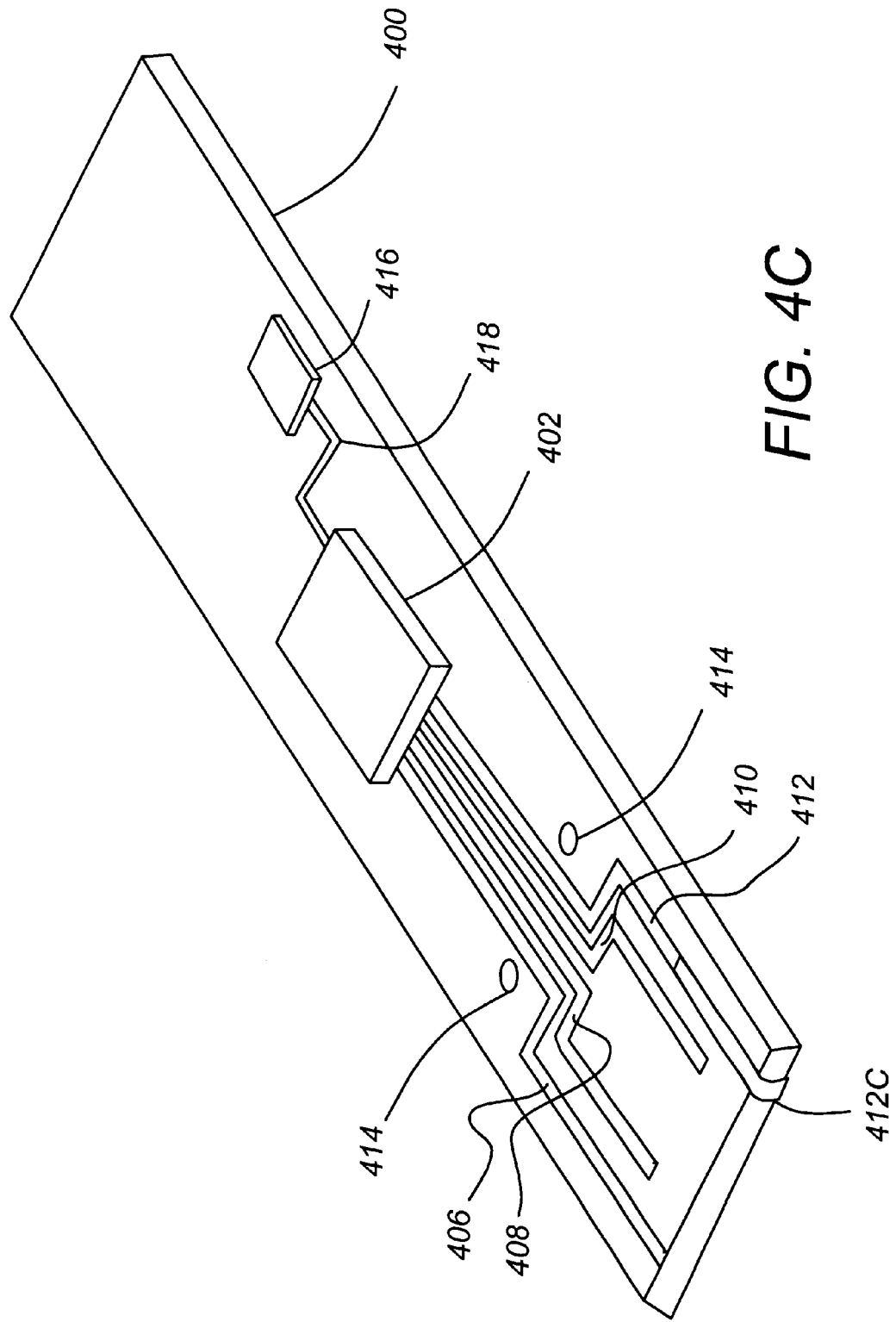
FIG. 4C is a diagram depicting another embodiment of the circuit board.

FIG. 4C is a diagram depicting another embodiment of the circuit board 402. In this embodiment, at least some of the conductive surfaces 406, 408, 410, and 412 comprises a clamp such as clamp 412C. The clamp 412C also provides extra thickness to account for the wear from repeated insertions/removals of the key 200 in and out of the I/O port 130.

Figure 5:
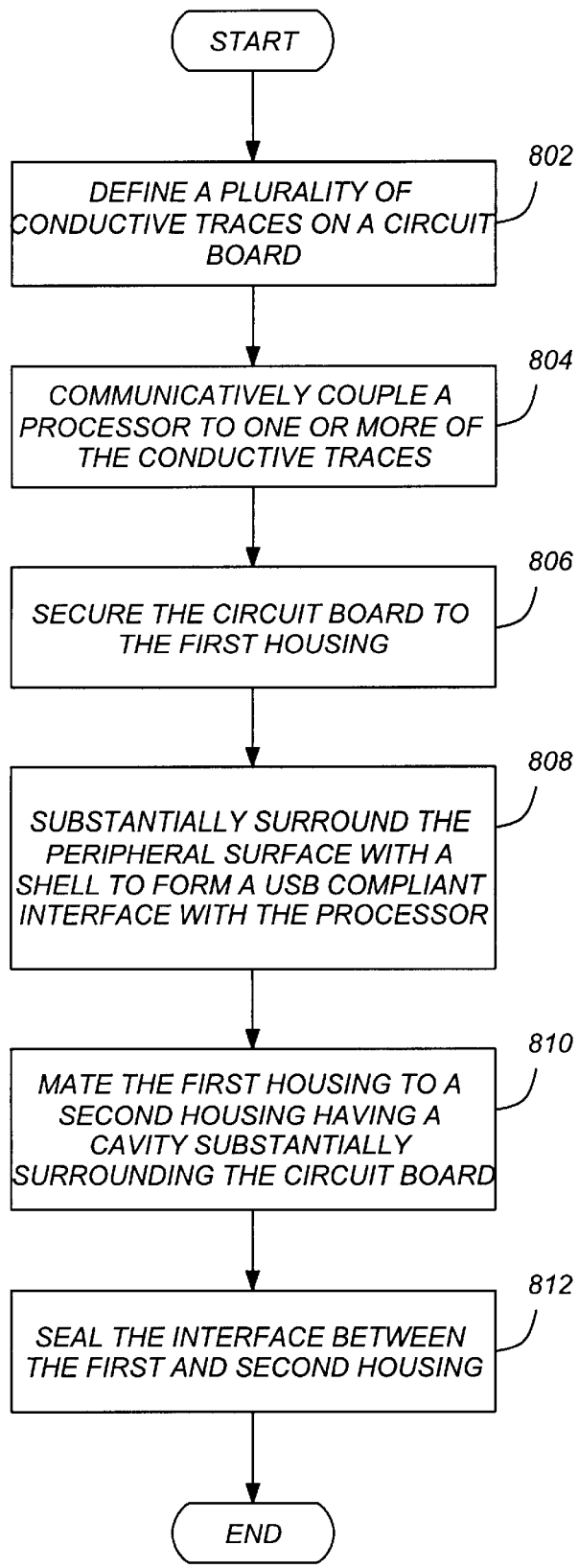
FIG. 5 is a diagram illustrating exemplary method steps for assembling the personal key.
Figure 6A:
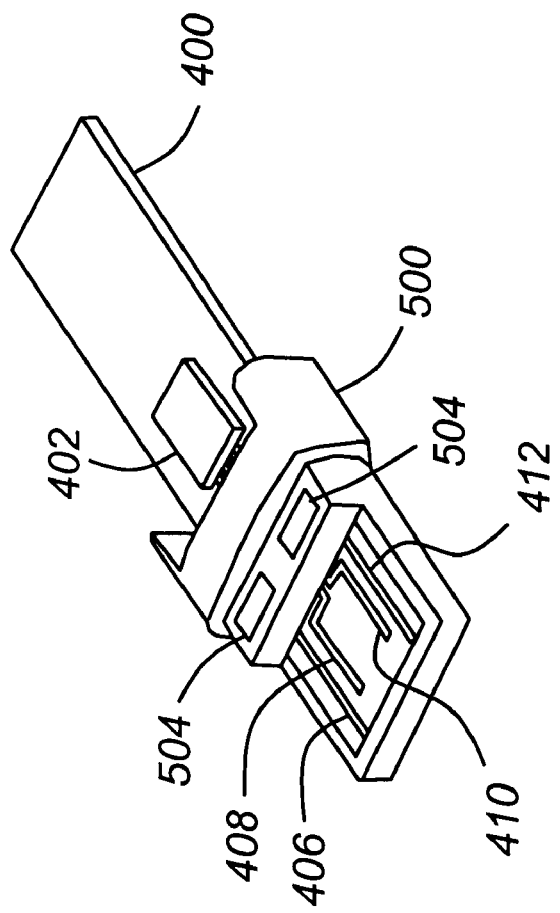
FIGS. 6A–6F are diagrams illustrating the method described in FIG. 5.
Figure 6B:
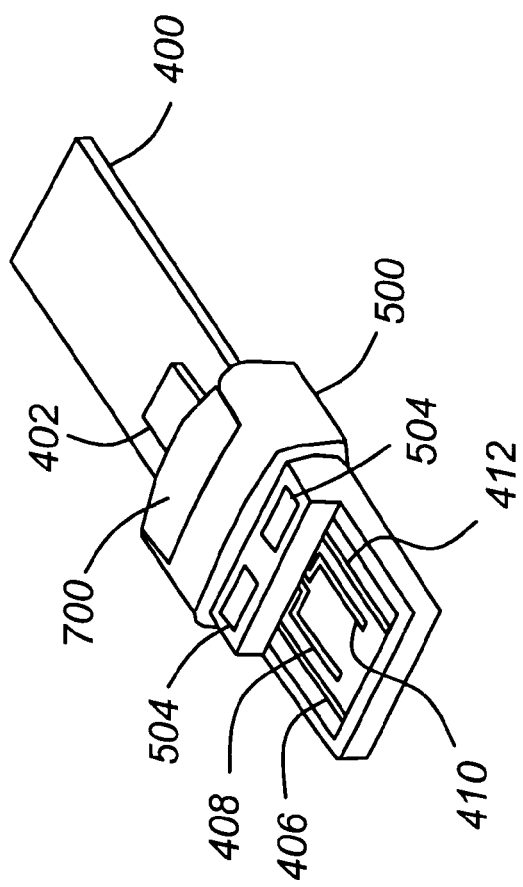

FIG. 5 is a flow chart presenting illustrative operations that can be used to assemble the key 200. A plurality of conductive traces 406, 408, 410, and 412 are defined on a circuit board 400, as shown in step 802. A processor is then communicatively coupled to one or more of the conductive traces 406, 408, 410, and 412, as shown in block 804. The circuit board 400 is then secured to the first housing 500. In one embodiment, this is accomplished by inserting the circuit board 400 into an aperture 508 in the first housing, thus exposing the peripheral portion of the circuit board and portions of the conductive traces 406, 408, 410 and 412 as shown in FIG. 6A, and inserting a plug member 700 into a cooperating feature of the circuit board as shown in FIG. 6B. FIG. 2 illustrates one embodiment of the cooperating features including dowels 702 that are inserted into female features of the circuit board 400.

Figure 6C:
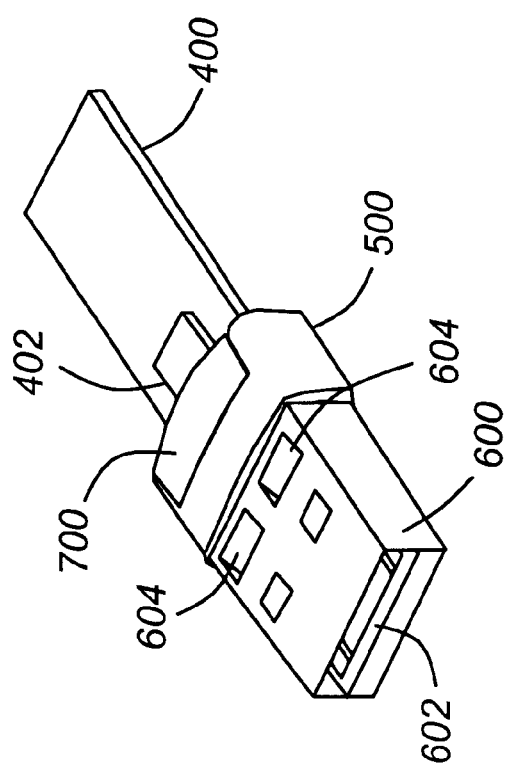

FIG. 6C illustrates a step wherein the peripheral surface of the circuit board is substantially surrounded by a shell 600, creating an aperture 602 having the conductive traces 406, 408, 410, and 412 and thus completing the USB-compliant interface with the processor 402. This is illustrated in block 808 of FIG. 5.

Figure 6D:
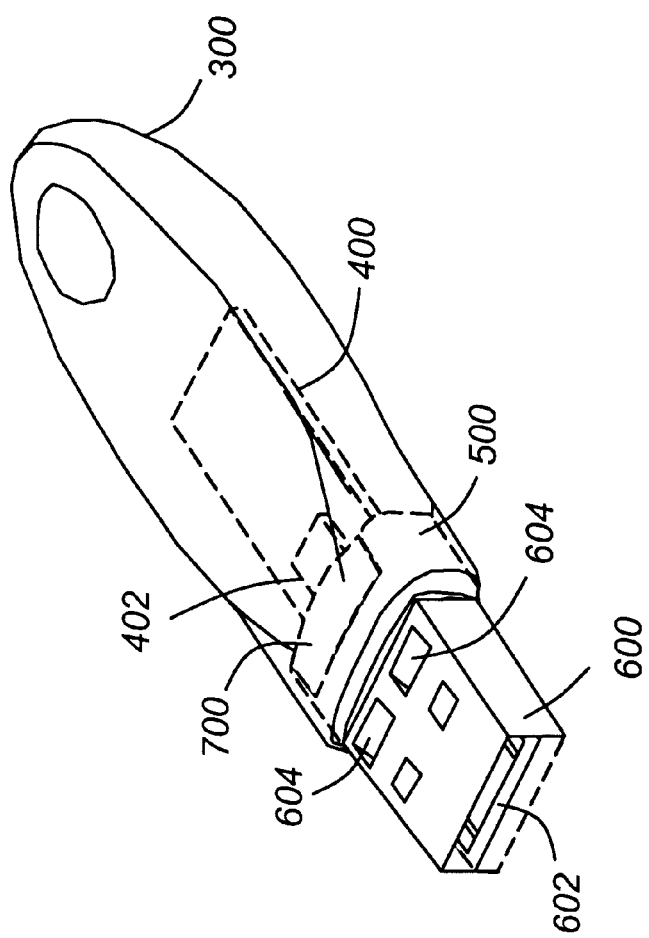

FIG. 6D illustrates a step wherein the circuit board 400 is substantially surrounded by enclosure within a cavity of a second housing 300. This step is also represented in block 810 of FIG. 5. In the illustrated embodiment, the second housing 300 has an opening that substantially matches the exterior dimension of the first housing 500, and the first housing 500 and the second housing 300 are mated together by sliding the second housing aperture over the first housing.

Figure 6E:
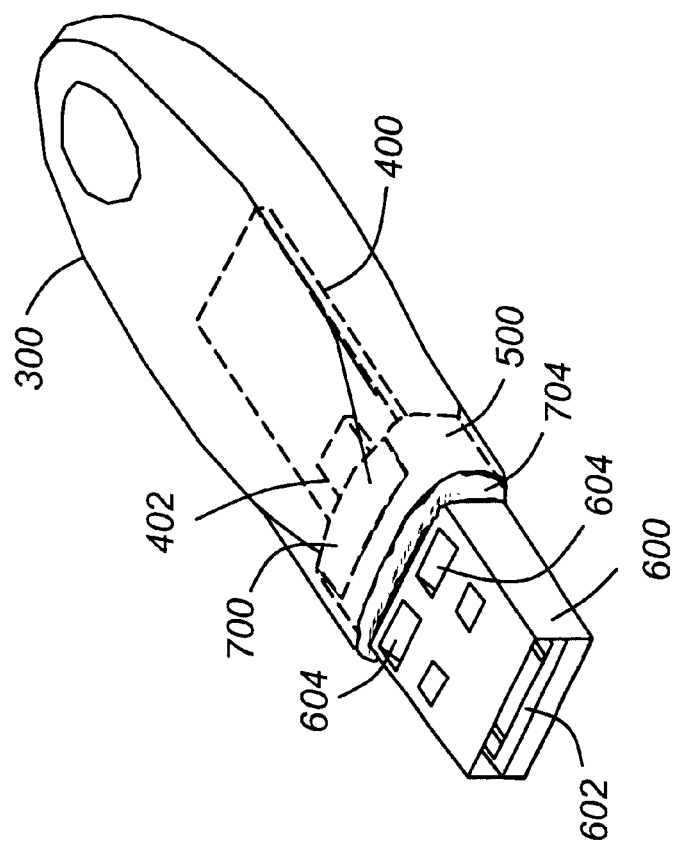

FIG. 6E illustrates a step wherein the interface between the first housing 500 and the second housing 300 is provided with a tamper-evident seal. In one embodiment, first housing 500 and the second housing 300 are hermetically sealed together. This can be accomplished by welding, gluing, or otherwise permanently fastening them together at the interface. This operation is represented in FIG. 5 as block 812.

Figure 6F:
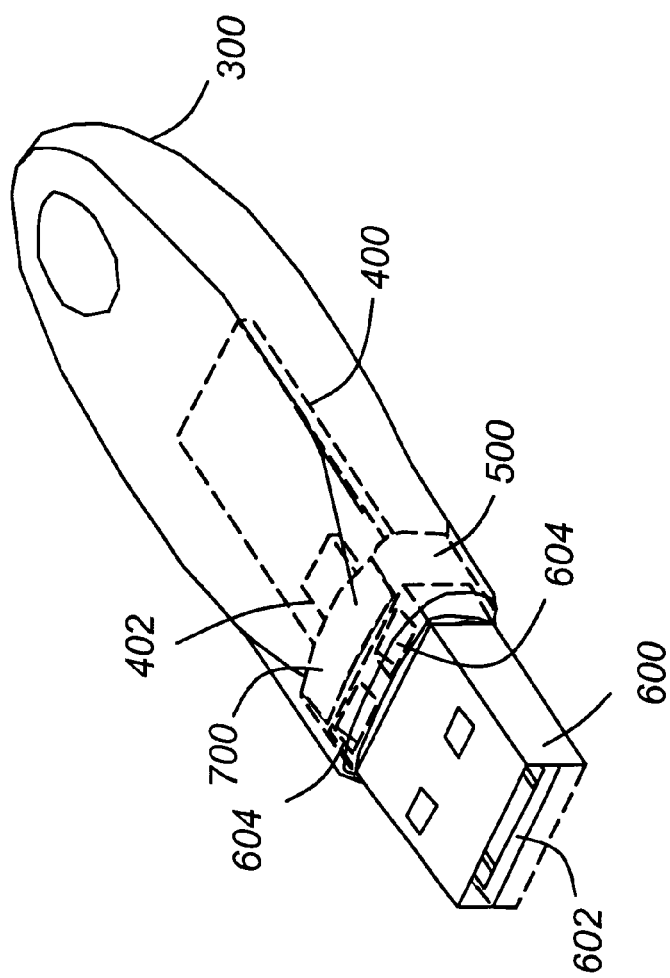

FIG. 6F is a diagram depicting an alternative embodiment of the invention that offers additional tamper-proof features. In this embodiment the shell 600 is elongated to extend within housing 500 (and the housing 500 includes additional space to permit insertion of the shell 600 therein). Depressed portions 504 and locking features 604 are relocated such that when the shell 600 is inserted and the locking features 604 interface with the depressed portions 504 to secure the shell 600 in place, the locking features 604 cannot be tampered with without such tampering being evident.

While FIGS. 6A–6F depict the assembly of the key 200 in a particular order, the present invention is not limited to the order of the steps as described. For example, the first housing 500 and second housing 300 could be mated together (and even tamper sealed together), and the process steps described above could be in different order as appropriate.

Conclusion

This concludes the description of the preferred embodiments of the present invention. As broadly described, the present invention is described by a personal key having a circuit board including conductive traces thereon that are presented external to the personal key for interface with a host computer I/O interface. The foregoing description of the preferred embodiment of the invention has been presented for the purposes of illustration and description. It is not intended to be exhaustive or to limit the invention to the precise form disclosed. Many modifications and variations are possible in light of the above teaching. For example, although embodiments describe herein include a plug for affixing the circuit board within the first housing aperture, different embodiments without a plug are within the scope of the present invention. The circuit board may be held in the correct position within the aperture by other structures interior to the personal key.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A personal token, comprising:
   a circuit board having
      a processor communicatively coupled to a memory, the processor for providing conditional access to data storable in the memory; and
      a plurality of conductive traces communicatively coupling the processor to a peripheral surface of the circuit board, where in the plurality of conductive traces includes a power trace, a ground trace, and at least two signal traces forming a universal serial bus (USE) compliant interface;
   a first housing having an aperture, the aperture configured to accept the peripheral surface of the circuit board therethrough, thereby presenting the plurality of conductive traces exterior to the aperture; and
   a shell, surrounding the plurality of conductive traces at the peripheral surface of the circuit board, the shell including at least one locking member interfacing with the first housing.

2. The personal token of claim 1, further comprising:
   a plug, insertable into the first housing, the plug comprising at least one member communicable with a cooperating member of the circuit board to retain the circuit board in the first housing aperture.

3. The personal token of claim 2, wherein the member is a male member and the cooperating member of the circuit board is a female member.

4. The personal token of claim 2, further comprising:
   a second housing substantially containing the circuit board, the second housing having a second housing aperture mating with the first housing.

5. The personal token of claim 2, further comprising a tamper-evident seal coupling the first housing and the second housing.

6. The personal token of claim 1, wherein at least one of the plurality of conductive traces comprises a first section of a first thickness and a second section of a second thickness greater than the first thickness.

7. The personal token of claim 6, wherein the conductive interface surface is selected from the group comprising:
   a conductive interface surface electroplated to the second section;
   a conductive interface surface bonded to the second section; and
   a spring.

8. A method of producing a personal token, comprising the steps of:
   defining a plurality of conductive traces on a circuit board, the plurality of traces extending to peripheral surface of the circuit board, wherein the plurality of traces includes a power trace, a ground trace, and at least two signal traces;
   communicatively coupling a processor to the plurality of traces;
   securing the circuit board to a first housing; and
   substantially surrounding the peripheral surface with a shell, wherein the shell and the plurality of conductive traces includes a power trace, a ground trace, and at least two signal traces forming a universal serial bus (USB) compliant interface.

9. The method of claim 8, wherein the step of securing the circuit board to the first housing comprises the steps of:
   inserting the peripheral surface of the circuit board through an aperture in a first housing, the aperture configured to accept the peripheral surface of the circuit board therethrough, thereby presenting the plurality of conductive traces exterior to the aperture; and
   securing the circuit board to the first housing.

10. The method of claim 9, wherein the step securing the circuit board to the first housing comprises the step of:
    inserting a plug member into a cooperating member of the circuit board.

11. The method of claim 9, further comprising the step of:
    mating an aperture of a second housing to the first housing, wherein the second housing comprises a cavity substantially surrounding the circuit board.

12. The method of claim 9, further comprising the step of:
    sealing an interface at the mating of the aperture of the second housing to the first housing.

13. The method of claim 12, wherein the step of sealing includes the step of:
    tamper evident sealing the interface at the mating of the aperture of the second housing to the first housing.

14. The method of claim 12, wherein the step of sealing includes the step of:
    hermetically sealing the interface at the mating of the aperture of the second housing to the first housing.

15. The method of claim 12, wherein the step of sealing includes the step of:
    welding the interface at the mating of the aperture of the second housing to the first housing.

16. The method of claim 12, wherein the step of sealing includes the step of:
    gluing the interface at the mating of the aperture of the second housing to the first housing.

17. A personal token, comprising:
    a circuit board having
       a processor communicatively coupled to a memory, the processor for providing conditional access to data storable in the memory; and
       a plurality of conductive traces communicatively coupling the processor to a peripheral surface of the circuit board, wherein the plurality of conductive traces includes a power trace, a ground trace, and at least two signal traces forming a universal serial bus (USB) compliant interface;
    a first housing first portion having an aperture, the aperture configured to accept the peripheral surface of the circuit board therethrough, thereby presenting the plurality of conductive traces exterior to the aperture; and
    a first housing second portion, communicable with the first housing first portion, the first housing second portion comprising at least one feature communicable with a cooperating feature of the first housing first portion to retain the circuit board in the first housing first portion aperture.

18. The personal token of claim 17, wherein the feature is further communicable with a cooperating feature of the circuit board to retain the circuit board in the first housing first portion aperture.

19. The personal token of claim 17, further comprising:
    a shell, surrounding the plurality of conductive traces at the peripheral surface of the circuit board, the shell including at least one locking member interfacing with the first housing.

20. The personal token of claim 17, further comprising:

a second housing substantially containing the circuit board, the second housing having an aperture mating with the first housing.

21. The personal token of claim 17, further comprising a tamper-evident seal coupling the first housing and the second housing.

22. The personal token of claim 17, wherein at least one of the plurality of conductive traces comprises a first section of a first thickness and a second section of a second thickness greater than the first thickness.

23. The personal token of claim 22, wherein the conductive interface surface is selected from the group comprising:

a conductive interface surface electroplated to the second section;

a conductive interface surface bonded to the second section; and a spring.

24. A personal token, comprising:

a circuit board having a processor communicatively coupled to a memory, the processor for providing conditional access to data storable in the memory; and a plurality of conductive traces communicatively coupling the processor to a peripheral surface of the circuit board, wherein the plurality of conductive traces includes a power trace, a ground trace, and at least two signal traces forming a universal serial bus (USB) compliant interface;

a means for substantially containing the circuit board; and a means for accepting and retaining the peripheral surface of the circuit board and for presenting the plurality of conductive traces external to the means for substantially containing the circuit board.

25. The personal token of claim 24, wherein the means for accepting and retaining the peripheral surface of the circuit board comprises an apertare configured to accept the peripheral surface of the circuit board therethrough.

26. The personal token of claim 24, wherein the means for accepting and retaining the peripheral surface of the circuit board comprises:

a first portion having the aperture; and a second portion for communicating with the first portion to retain the circuit board in the aperture.

27. The personal token of claim 24, further comprising:

means for surrounding the plurality of conductive traces at the peripheral surface of the circuit board, including at least one means for interfacing with the means for accepting and retaining the peripheral surface of the circuit board and for presenting the plurality of conductive traces external to the means for substantially containing the circuit board.

28. The personal token of claim 24, further comprising a tamper-evident seal coupling the means for substantially containing die circuit board and the means for accepting and retaining the peripheral surface of the circuit board and for presenting the plurality of conductive traces external to the means for substantially containing the circuit board.

29. The personal token of claim 24, wherein at least one of the plurality of conductive traces comprises a first section of a first thickness and a second section of a second thickness greater than the first thickness.

30. The personal token of claim 29, wherein the conductive interface surface is selected from the group comprising:

a conductive interface surface electroplated to the second section;

a conductive interface surface bonded to the second section; and a spring.

* * * * *